(12) United States Patent
Whitney

(10) Patent No.: US 12,442,352 B1
(45) Date of Patent: Oct. 14, 2025

(54) SYSTEMS AND METHODS FOR COORDINATING AN AIR BLEND VALVE WITH AN INTAKE AIR HEATER

(71) Applicant: SAUDI ARABIAN OIL COMPANY, Dhahran (SA)

(72) Inventor: Christopher Whitney, Commerce, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/754,840

(22) Filed: Jun. 26, 2024

(51) Int. Cl.
*F02M 31/12* (2006.01)
*F02B 9/04* (2006.01)
*F02M 31/20* (2006.01)
*F02M 35/10* (2006.01)

(52) U.S. Cl.
CPC ............ *F02M 31/12* (2013.01); *F02B 9/04* (2013.01); *F02M 31/205* (2013.01); *F02M 35/10255* (2013.01)

(58) Field of Classification Search
CPC .......... F02M 31/12; F02M 31/205; F02M 35/10255; F02B 9/04
See application file for complete search history.

(56) References Cited

U.S. PATENT DOCUMENTS

| | | | |
|---|---|---|---|
| 5,628,185 A | 5/1997 | Rowe | |
| 6,286,482 B1 * | 9/2001 | Flynn | F02D 13/0215 123/480 |
| 2012/0291760 A1 * | 11/2012 | Vigild | F02M 31/13 123/549 |

(Continued)

FOREIGN PATENT DOCUMENTS

| | | |
|---|---|---|
| CN | 109538347 A | 3/2019 |
| DE | 41 09 436 C1 | 5/1992 |
| EP | 0 983 433 B1 | 5/2007 |

OTHER PUBLICATIONS

Luján, José Manuel et al., "Potential of exhaust heat recovery for intake charge heating in a diesel engine transient operation at cold conditions"; Applied Thermal Engineering; vol. 105; pp. 501-508; Jul. 25, 2016 (8 pages).

(Continued)

*Primary Examiner* — Syed O Hasan
(74) *Attorney, Agent, or Firm* — Osha Bergman Watanabe & Burton LLP

(57) ABSTRACT

A compression ignition engine includes an air intake port, an intake air heater disposed upstream of the air intake port and an air blend valve in communication with the intake air heater and the air intake port, and a control unit is configured to perform the noted method. A method includes determining a target temperature for intake air at an air intake port of a compression ignition engine; determining a maximum port temperature for an air blend valve of the engine; designating an intake air heater or the air blend valve as a primary actuator for controlling temperature of the intake air, based on the maximum port temperature of the air blend valve; and controlling the temperature of the intake air based on the designated primary actuator. A non-transitory computer-readable storage medium has instructions stored thereon, which when executed by a computer cause the computer to perform the method.

16 Claims, 7 Drawing Sheets

(56) References Cited

U.S. PATENT DOCUMENTS

2015/0114339 A1* 4/2015 Sellnau ............... F02B 29/0412
123/294

OTHER PUBLICATIONS

De Ojeda, William et al., "Low-Temperature Combustion Demonstrator for High Efficiency Clean Combustion"; 2007 Progress Report for Advanced Combustion Engine Technologies, II.A. 19; pp. 124-127; Dec. 2007 (4 pages).

* cited by examiner

SYSTEMS AND METHODS FOR COORDINATING AN AIR BLEND VALVE WITH AN INTAKE AIR HEATER

BACKGROUND

Conventionally, most vehicular engines are spark-ignited gasoline engines. Diesel engines are also widely used and are generally compression-ignited, without using a spark. Diesel engines tend to offer better fuel economy, but generally do not achieve similar emissions targets as spark-ignited gasoline engines.

Gas compression ignition (GCI) engines, representing a combination of the two types just noted, are fueled with gasoline but use compression ignition. GCI engines tend to be more fuel-efficient and lower in emissions than the other two types, but are generally more difficult to control in view of the comparatively lower reactivity of gasoline.

In this connection, a key factor in achieving robust combustion is the "promotion" of an air and fuel mixture in a cylinder. The mixture needs to be promoted enough to ignite reliably, which is normally achieved via an increase in intake air temperature, compression ratio, intake air pressure, or hot residual gases. Yet despite the inherent advantages of promotion, an excess of the same may lead to decreased fuel economy, degraded or increased emissions, or increased noise. Thus, remedial measures may be taken to mitigate such effects, such as via lowering intake air temperature or pressure. However, such measures may also amount an undesirable compromise in engine performance.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method that includes: determining a target temperature for intake air at an air intake port of a compression ignition engine; determining a maximum port temperature for an air blend valve of the compression ignition engine; designating an intake air heater or the air blend valve as a primary actuator for controlling temperature of the intake air, based on the maximum port temperature of the air blend valve; and controlling the temperature of the intake air based on the designated primary actuator.

In one aspect, embodiments disclosed herein relate to a compression ignition engine that includes an air intake port, an intake air heater disposed upstream of the air intake port and an air blend valve in communication with the intake air heater and the air intake port. A control unit is configured to: determine a target temperature for intake air at the air intake port; determine a maximum port temperature for the air blend valve; designating the intake air heater or the air blend valve as a primary actuator for controlling temperature of the intake air, based on the maximum port temperature of the air blend valve; and control the temperature of the intake air based on the designated primary actuator.

In one aspect, embodiments disclosed herein relate to a non-transitory computer-readable storage medium having computer-readable instructions stored thereon, which when executed by a computer cause the computer to perform a method that includes: determining a target temperature for intake air at an air intake port of a compression ignition engine; determining a maximum port temperature for an air blend valve of the compression ignition engine; designating an intake air heater or the air blend valve as a primary actuator for controlling temperature of the intake air, based on the maximum port temperature of the air blend valve; and controlling the temperature of the intake air based on the designated primary actuator.

Any combinations of the various embodiments and implementations disclosed herein can be used in a further embodiment, consistent with the disclosure. Other aspects and advantages of the claimed subject matter will be apparent from the following description and the appended claims.

DETAILED DESCRIPTION

Broadly contemplated herein, in accordance with one or more embodiments, are measures for enhancing performance in GCI engines while averting the conventional drawbacks such as those noted heretofore. Accordingly, to gain promotion and performance in a GCI engine while mitigating the noted adverse effects (e.g., decreased fuel economy, degraded or increased emissions, or increased noise), systems and methods as broadly contemplated herein involve precision control of the air temperature in intake ports of an engine. More particularly, in accordance with at least one illustrative working example, precision control of an intake air heater (IAH) and an air blend valve (ABV) is contemplated, that then controls the air temperature in intake ports of the engine, to thus assist in precision control of the promotion of combustion. Additionally, though working examples discussed and contemplated herein mainly relate to GCI engines, it should be understood that similar or analogous principles may also be applied to diesel compression ignition engines.

Figure 1:
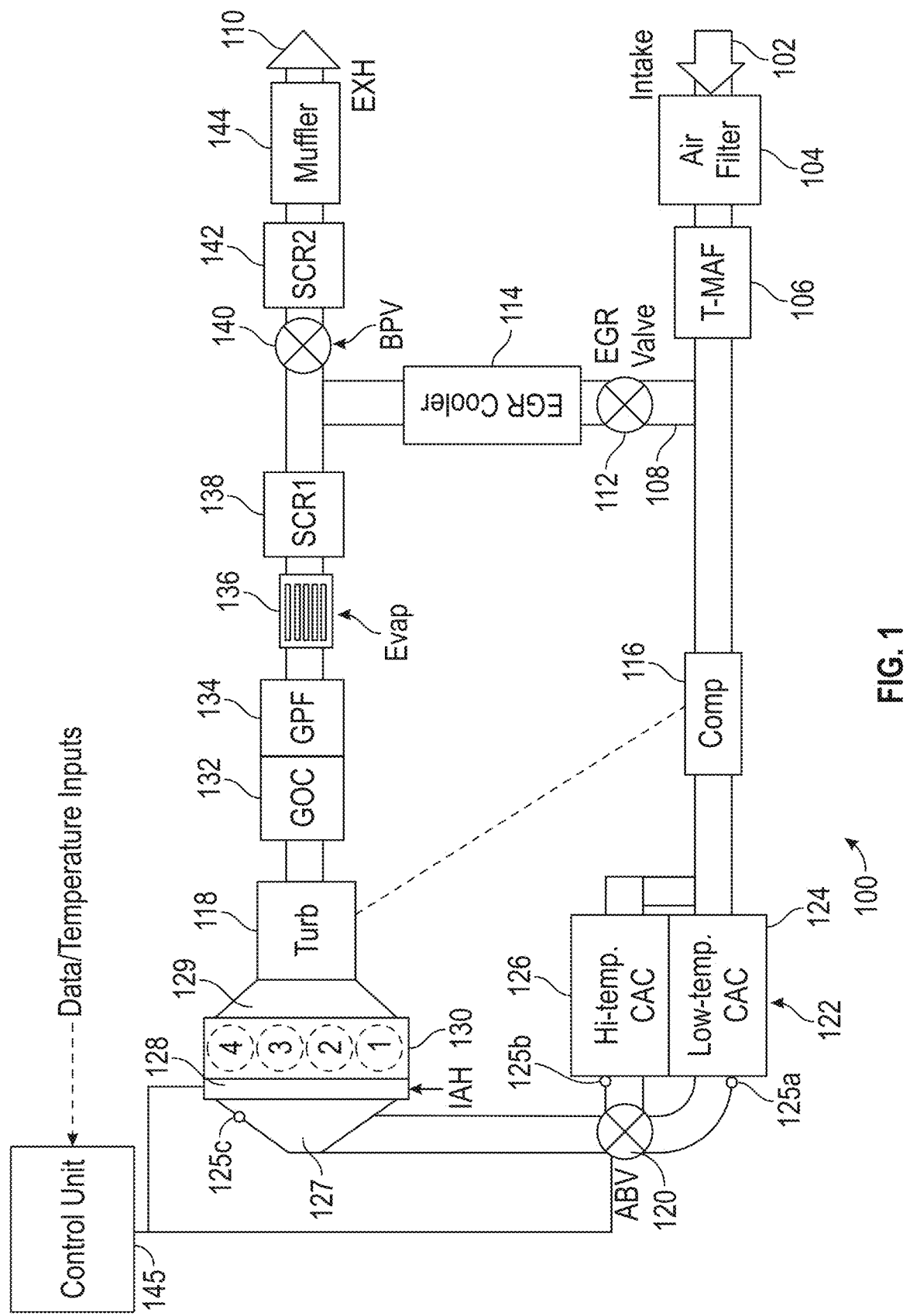
FIG. 1 schematically illustrates a gas compression ignition engine that includes both an intake air heater and an air blend valve, in accordance with one or more embodiments.

In accordance with one or more embodiments, FIG. 1 schematically illustrates a GCI engine 100 that includes both an IAH and an ABV. It should be understood that the engine 100 shown is provided merely by way of an illustrative and non-restrictive working example, and that key principles as broadly described and contemplated herein may be utilized in any of a great variety of GCI or diesel compression ignition engines.

As such, and in accordance with one or more embodiments, connected downstream and in series from an intake 102 are an air filter 104 and T-MAF (mass air flow) sensor 106. A branch channel 108 in communication with exhaust 110 includes an EGR (exhaust gas recirculation) valve 112 and EGR cooler 114.

In accordance with one or more embodiments, a compressor 116 may be driven by a turbo 118 that itself is controlled via a variable nozzle turbocharger. As shown, an ABV 120 is located just downstream of a CAC (charge air cooler) 122. The CAC 122 includes two associated portions in parallel, with one portion for cooling (or "low-temp liquid-cooled CAC", or "low-temperature portion") 124 and one portion for heating (or "high-temp liquid-heated CAC", or "high-temperature portion") 126. An IAH 128 is shown downstream of the ABV 120 and an intake manifold 127, but alternatively could be connected in series between high-temp CAC 126 and the ABV 120. Air intake ports (or simply, "intake ports") 130, in communication with intake manifold 127 and IAH 128, are individually numbered 1 through 4. Turbocharger 118 is in communication exhaust with manifold 129, itself in communication with exhaust ports (not otherwise illustrated in FIG. 1). Air temperature sensors, as indicated at 125a and 125b, may be disposed at the outlets of the low-temp CAC 124 and high-temp CAC 126, respectively. Additionally, one or more air temperature sensors, as indicated at 125c, may be disposed at the intake manifold 127 to measure air temperature just prior to entry into the IAH 128. As will be discussed more fully below, air temperature measurements taken by sensors 125a, 125b and 125c may be used in controlling the ABV 120 and IAH 128.

In accordance with one or more embodiments, additional components downstream of turbocharger 118 may include, but need not be limited to GOC (gasoline oxidation catalyst) 132, gasoline particulate filter (GPF) 134, urea evaporator 136, first selective catalytic reduction (SCR1) 138, back pressure valve 140, a second SCR (SCR2) 142 and muffler 144.

In accordance with one or more embodiments, the high-temp CAC 126 obtains its heat from engine coolant, particularly waste heat, and is not available during a cold start when the coolant is cold. In such an instance, the IAH 128, powered by electrical current, can be used to heat the intake air. Because the ABV 120 is understood as heating air more efficiently than the IAH 128 in using waste heat, systems and methods as broadly contemplated herein can involve using the ABV 120 as much as possible and the IAH 128 as little as possible in heating the intake air. However, a full range of possibilities for controlling air intake temperature will be better appreciated from the ensuing discussion.

In accordance with one or more embodiments, a control unit 145 may be in communication with the ABV 120 and IAH 128 to control or actuate the same in a manner to control air intake temperature, as discussed here below. Additionally, the control unit 145 may receive temperature measurements from sensors 125a, 125b and 125c in a manner to control or actuate the ABV 120 and IAH 128, and as discussed more fully below. Generally, the control system 145 includes a computer system that can be the same as, or is in communication with, the computer system 785 described and illustrated with respect to FIG. 7.

The disclosure now turns to a discussion of an algorithm and related components as shown in FIGS. 2-5, and that may be utilized in connection with a compression engine such as that described and illustrated with respect to FIG. 1, in accordance with one or more embodiments. Throughout the discussion, reference may continue to be made to FIG. 1.

Figure 2:
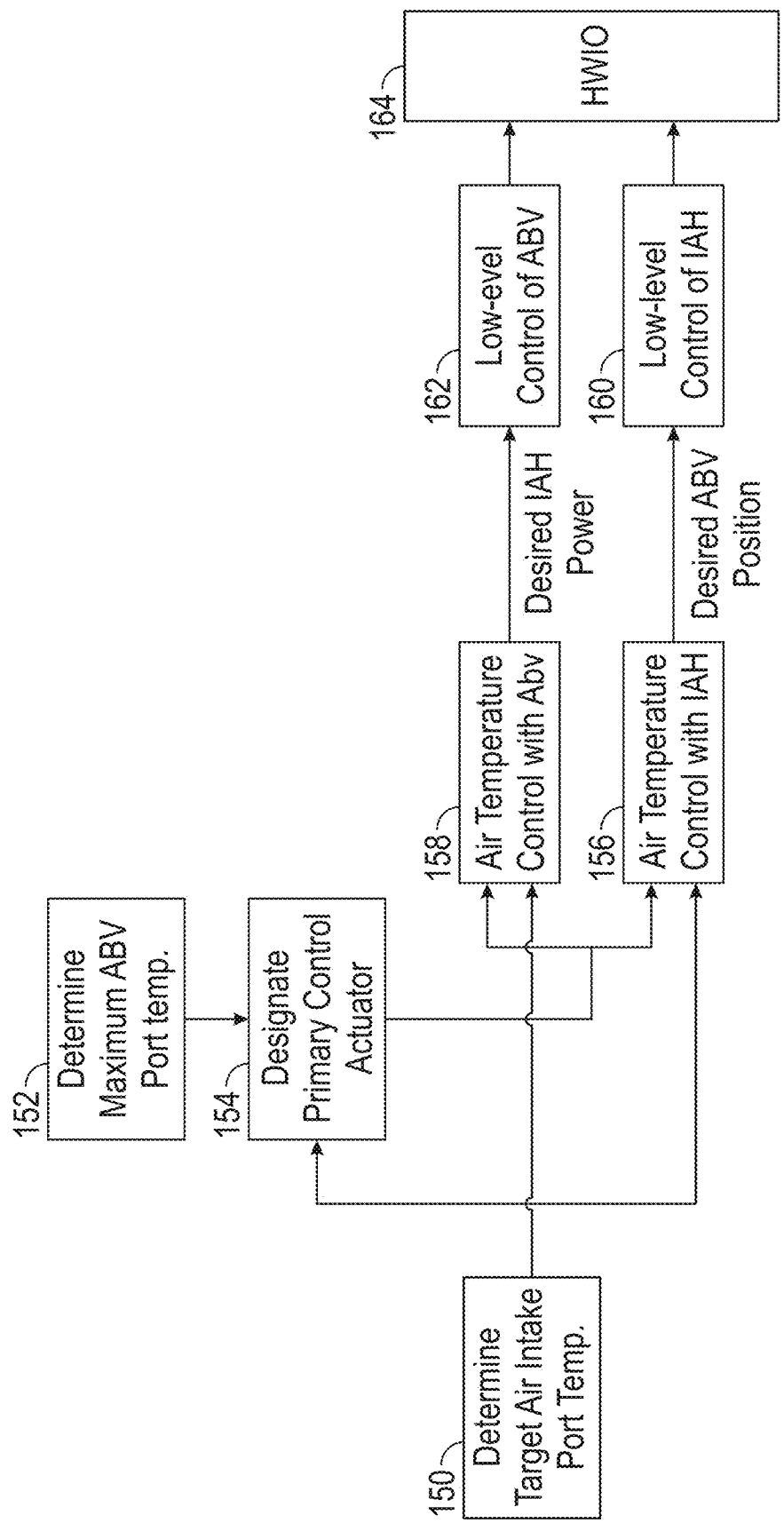
FIG. 2 schematically illustrates high-level components of a software control algorithm that may be employed in accordance with one or more embodiments.

FIG. 2 schematically illustrates high-level components of a software control algorithm that may be employed in accordance with one or more embodiments. The algorithm may be utilized in an embedded controller of an automotive application such as and, in this connection, may reside in a control unit such as that indicated at 145 in FIG. 1 or in a computer 785 such as that described and illustrated with relation to FIG. 7. As will be appreciated herebelow, the algorithm facilitates precision control of IAH 128 and ABV 120 that in turn controls the air temperature in the intake ports 130 of engine 100, to thus assist in precision control of the promotion of combustion.

In accordance with one or more embodiments, the algorithm may determine a desired target air intake port temperature for optimal or desirable promotion (150); hereinafter, this is referred to as the "target temperature" for intake ports 130. The target temperature may be a function of torque/load request and engine speed, and of any other component that may affect promotion. The algorithm may also determine a maximum capacity or capability of the ABV 120, via determining (152) a maximum port temperature for the ABV 120. For this purpose, air temperature measurements of at outlets of high-temp CAC 126 and low-temp CAC 124 may be input.

In accordance with one or more embodiments, the algorithm may then designate (154) the IAH 128 or the ABV 120 as a primary actuator for air temperature control at intake ports 130. If (156) the IAH 128 is designated as primary actuator, then the ABV 120 is set to a desired position in support and ultimately iterative, low-level control (160) of the IAH 128 ensues, with related signals or commands transmitted from control unit 145 via an output interface (or "hardware interface" or "HWIO") 164. If (158) the ABV is designated as primary actuator, then the IAH 128 is set to a desired power level in support and ultimately iterative, low-level control (162) of the ABV 120 ensues, with related signals or commands transmitted from control unit 145 via an output interface (or "hardware interface", or "HWIO") 164.

In other words, in accordance with one or more embodiments and in each of the above-noted cases, it can be appreciated generally that when using the IAH 128 or ABV 120 as a primary actuator, the ABV 120 or IAH 128, respectively, can be set once to a static position in support of the primary actuator while the primary actuator itself continues to undergo an iterative, fine-tuned adjustment in the noted "low-level" control. An illustrative and non-restrictive example can be appreciated in the context of engine warmup. Particularly, in such an example, the IAH 128 can be set to zero power to conserve electrical power, while the ABV 120 would then modulate the port temperature using "free waste heat" from engine coolant. Further aspects of steps related to use of the IAH 128 or ABV 120 as a primary actuator will be better appreciated from the ensuing discussion, particularly in connection with FIGS. 4 and 5, respectively.

Figure 3:
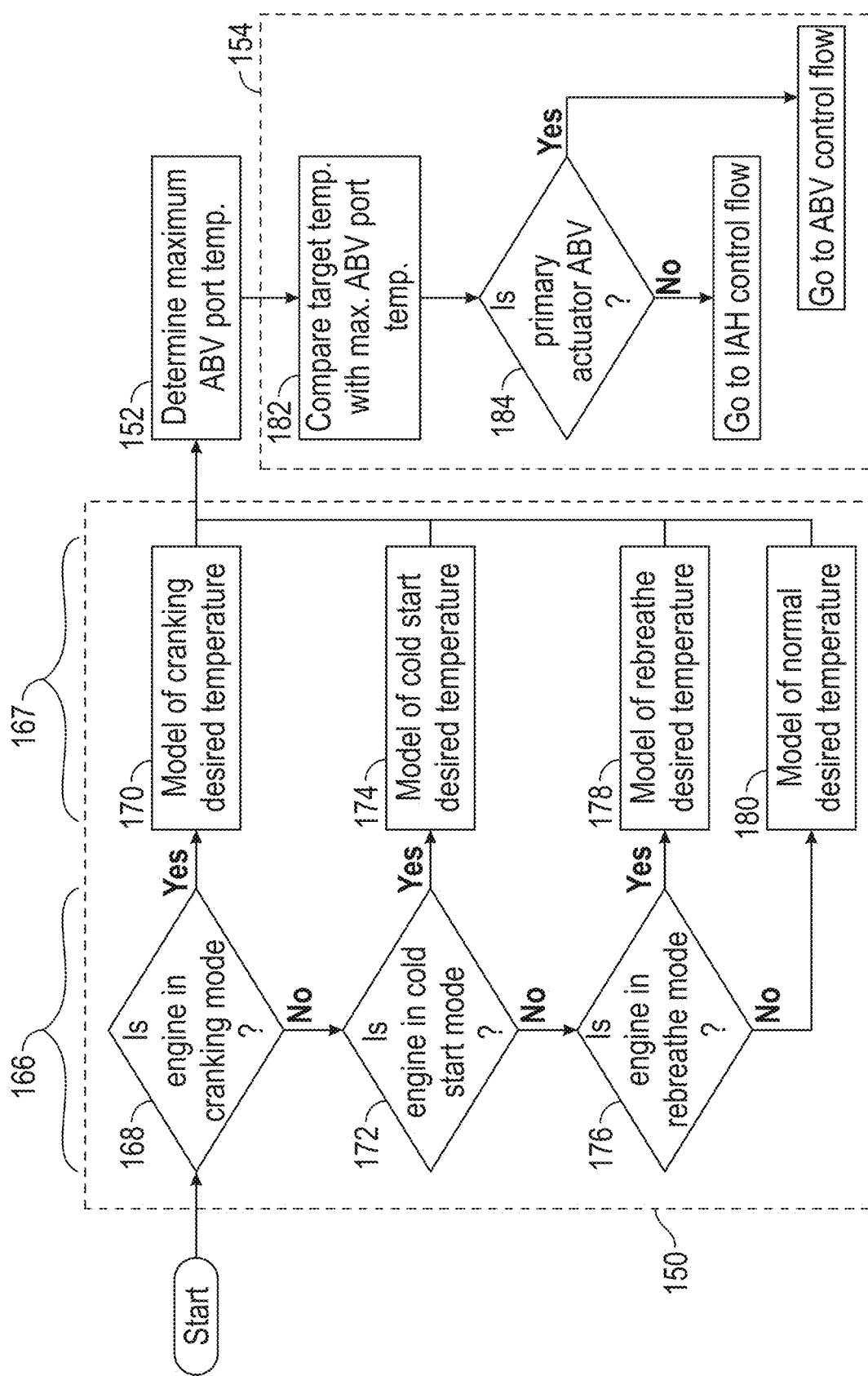
FIG. 3 schematically illustrates various steps from FIG. 2 in additional detail, in accordance with one or more embodiments.

FIG. 3 schematically illustrates various steps from FIG. 2 in additional detail, in accordance with one or more embodiments. In this connection, FIG. 3 depicts the steps for determining a target temperature (150), determining a maximum capacity or capability of the ABV 120, via calculating a maximum ABV port temperature (152) and determining a primary control actuator (154). Accordingly, a target temperature can first be determined (150) toward an objective of gaining promotion while mitigating adverse effects such as decreased fuel economy, degraded or increased emissions, or increased noise. In this connection, the target temperature can be understood as a function of a variety of factors that may affect promotion, such as torque/load request and engine speed.

Thus, in accordance with one or more embodiments, a set of queries 166 can determine a current engine mode. Though a very wide variety of possible engine modes can be considered, in accordance with the present working example the queries 166 can determine whether the engine is in a cranking mode, cold start mode, rebreathe mode or normal mode. Each of the modes may then have a corresponding temperature model associated with it, from among a set of temperature models 167.

Thus, in accordance with one or more embodiments, a determination may be made as to whether the engine is in a cranking mode (168). If "yes", then a corresponding cranking temperature model 170 is consulted or employed for determining the target temperature. If "no", a determination may be made as to whether the engine is in a cold start mode (172). If "yes", then a corresponding cold start temperature model 174 is consulted or employed for determining the target temperature. If "no", a determination may be made as to whether the engine is in a rebreathe mode (176). If "yes", then a corresponding rebreathe temperature model 178 is consulted or employed for determining the target temperature. If "no", then the engine may be deemed to be in a normal mode, and a corresponding normal temperature model 180 is then consulted or employed for determining the target temperature. While the noted sequence of determining engine modes (cranking, cold start, rebreathe, normal) is provided as an illustrative working example, it should be understood that the noted modes, or other engine modes, may be determined in essentially any sequence that may be deemed suitable or desirable.

In accordance with one or more embodiments, as may be deemed suitable, the temperature models 167 may each involve one or more equations, or lookup tables, or both. Such equations or lookup tables may be configured to determine a target temperature as a function of vehicle speed, torque and piston temperature. Thus, by way of a merely illustrative example, the cold start temperature model 174 may take into account that combustion is promoted less when piston temperatures are cold, thus one or more corresponding target temperatures may provide for hotter intake air. In accordance with another illustrative example, the rebreathe temperature model 178 may take into account that there is more promotion arising from hot exhaust gases being re-inducted into a cylinder, thus one or more corresponding target temperatures may provide for less of a need for a relatively higher temperature of the intake air.

Generally, in accordance with one or more embodiments, the queries 166 may be executed in essentially any manner deemed suitable, based on inputs or data that permit a ready determination of any or all of the engine modes in play. By way of an illustrative and non-restrictive example, the stage of determining a normal mode may be reached if coolant temperature is about 90 degrees Celsius (within a small range of a few degrees above or below). The normal temperature model 180, used for determining a target intake temperature, may then merely involve a simple lookup from a calibration table. By way of another illustrative and non-restrictive example, the query 172 for cold start mode may involve determining that coolant and oil temperatures are in an ambient temperature range and that the engine has not been run for a predetermined period of time (e.g., a certain number of hours).

In accordance with one or more embodiments, queries 166 for determining a current engine mode can involve one or modes instead of or in addition to those specifically described and illustrated with respect to FIG. 3. For instance, a "hot restart mode" can be defined, whereby the engine may have been shut down for a period of time and during which pistons and cylinders may have cooled. As associated algorithm can then apply heat from the source (IAH 128 or ABV 120) deemed preferable for achieving better emissions and torque. A "motoring mode" can also be defined, which may apply to cold starts to preheat intake air and catalysts (e.g., using a catalyst heater) to ensure that the intake air and catalysts are at desired temperatures when fuel is first injected. Additional modes are conceivable, e.g., that would encompass long downhill runs with no fuel flow and an exhaust brake being active.

In accordance with one or more embodiments, a maximum capacity or capability of the ABV 120 can then be determined, via calculating a maximum ABV port temperature (152); this may also be referred to as determining the temperature authority of the ABV 120. Here, air temperature measurements may be taken at respective outlets of the high-temp CAC 126 and low-temp CAC 124, via sensors 125b and 125a, respectively, and then input into a model. The model may then estimate both maximum and minimum ABV port air temperatures based on any of a variety of factors that may include transport temperature loss from the CAC 122 through the ABV 120, through the intake manifold 127 and into the intake ports 130. The estimates of maximum and minimum ABV port air temperatures can correspond, respectively, to whether the ABV is in a full-hot (or "parked hot") or full-cold position.

As an illustrative example, in accordance with one or more embodiments, the aforementioned model may be effected via a lookup table that can be calibrated as a function of the difference between a measured air temperature at the CAC 122 (e.g., as measured at sensor 125a at the outlet of low-temp CAC 124) and ambient air temperature, and of measured mass airflow (e.g., as measured at sensor 106). The difference between the measured CAC temperature and the ambient air temperature can then be an indicator of how much heating or cooling may end up progressing to walls of the intake manifold 127. The measured mass airflow, for its part, can be an indicator of how long the intake air will reside at surfaces of the intake manifold 127 and intake ports 130.

In accordance with one or more embodiments, a determination, or designation, can then be made as to whether the IAH 128 or the ABV 120 is to be used a primary actuator for air temperature control (154). To this end, the target temperature is compared (182) with the calculated maximum ABV port temperature (i.e., the maximum capability of the ABV). Thus, at step 184, if the target temperature is less than the maximum ABV port temperature, then ("yes") the ABV 120 is designated as the primary actuator for air temperature control, and the algorithm proceeds to a control flow such as that described and illustrated with respect to FIG. 5, and corresponding to blocks 156 and 160 from FIG. 2. Otherwise ("no"), the IAH 128 is designated as the primary actuator for air temperature control, and the algorithm proceeds to a control flow such as that described and illustrated with respect to FIG. 4, and corresponding to blocks 158 and 162 from FIG. 2. In order to avoid excessive or undue toggling between the two control flows (or "modes") mentioned, hysteresis may be applied as deemed suitable. For instance, by way of an illustrative and non-restrictive example, hysteresis may be applied by using a hysteresis band, wherein a zone is defined between two states in which no action is taken unless the band is completely traversed. The band could thus be entered and exited on the same side without triggering a switch between the two control flows or modes.

Figure 4:
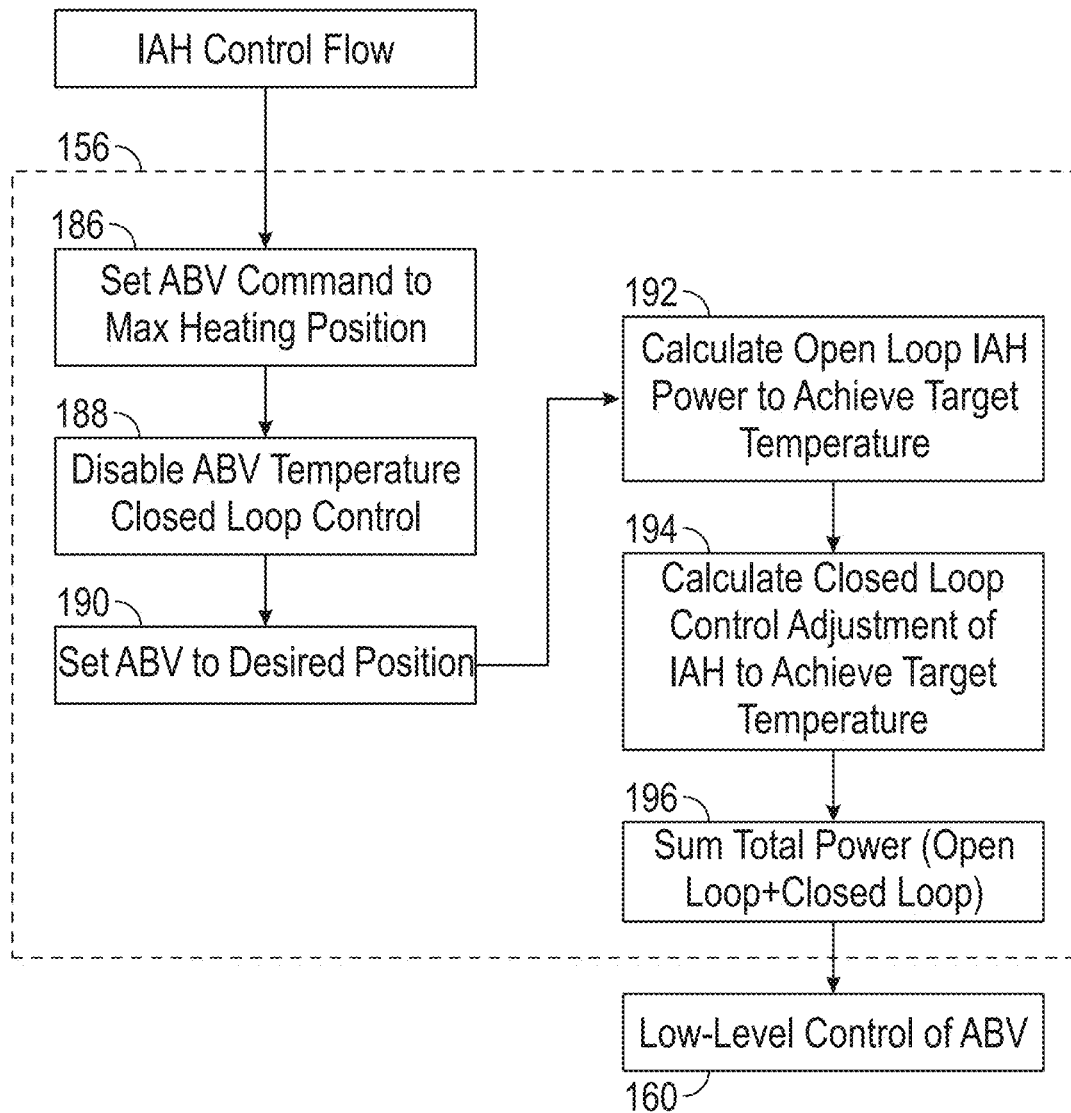
FIG. 4 schematically illustrates steps of a process for effecting air temperature control with an air blend valve as a primary actuator and as initially introduced in FIG. 2, in accordance with one or more embodiments.

Thus, in accordance with one or more embodiments, FIG. 4 schematically illustrates steps of the process 156/160 for effecting air temperature control with the IAH 128 as a primary actuator and as initially introduced in FIG. 2. As shown, the ABV 120 may first (186) be set to a maximum heating position (or a "parked hot" position). The IAH 128 is then controlled to provide additional heating that achieves a difference between the maximum ABV port temperature and the target temperature.

In accordance with one or more embodiments, as shown in FIG. 4, ABV temperature closed loop control is disabled (188) and the ABV 120 is then controlled to a desired position (190) in support of the use of the IAH 128 as the primary actuator. Thus, in accordance with the present working example, the ABV 120 can be set to an "intermediate" position after first being set to the maximum heating position, which could provide some minimum level of heat to the intake manifold during warmup. This may be of particular benefit at a later point in the engine warmup process, when coolant temperatures may be approaching a target level (e.g., 90 degrees Celsius).

In accordance with one or more embodiments, for an ongoing process of active control of the IAH 128, an open loop power request for the IAH 128 is calculated (192). Toward this end, the amount of additional heating (temperature increase) that the IAH needs to provide is calculated at a current timepoint. If the IAH 128 is installed as shown in FIG. 1, just downstream of the intake manifold 127 and just upstream of the intake ports 130, then this amount for a current timepoint is equal to the target temperature minus a temperature measured in the intake manifold 127 via sensor 125c. If the IAH 128 is be connected in series between high-temp CAC 126 and ABV 120, then the noted amount for a current timepoint may be a modelled as the temperature required at an inlet of ABV 120 (to result in a given temperature at intake ports 130, taking into account temperature loss at the ABV 120 and at intake manifold 127) minus the temperature measured at the outlet of high-temp CAC 126 via sensor 125b.

In accordance with one or more embodiments, the open loop power request itself corresponds to the amount of power required by the IAH 128 to achieve the noted amount of additional heating for a current timepoint, based on airflow and pressure measured in the intake manifold 127. In that connection, airflow may be measured by T-MAF sensor 106 and the manifold pressure via sensor 125c (e.g., as derived from measured temperature). The noted amount of power can be determined, merely by way of illustrative example, via a lookup table that maps temperature differences (or needed amounts of heating) to different quantities of intake manifold airflow. The table can be calibrated with prior (empirical) data obtained from the engine.

In accordance with one or more embodiments, a closed loop system is then used to supplement the open loop power request (194). While the aforementioned open loop path permits the system to respond quickly to a transient temperature request, the closed loop system helps achieve the final target temperature and compensates for errors or variances effected by the open loop model. Thus, the closed loop system can utilize as inputs the target temperature and intake port temperatures measured via sensor 125c. By way of illustrative and non-restrictive example, a PID (proportional-integral-derivative) controller may be utilized as a constituent portion of the closed loop system.

In accordance with one or more embodiments, a total power may then be determined by summing the values calculated for the open loop power request and the closed loop power request (196). This summed value may then be controlled to the IAH 128 relative to the type of heater and electrical device in use, to effect iterative, low-level control (160) of the IAH 128. Merely by way of illustrative and restrictive examples, such control may be effected by a PWM (pulse-width modulation) control with solid state relays, or by voltage controls.

Figure 5:
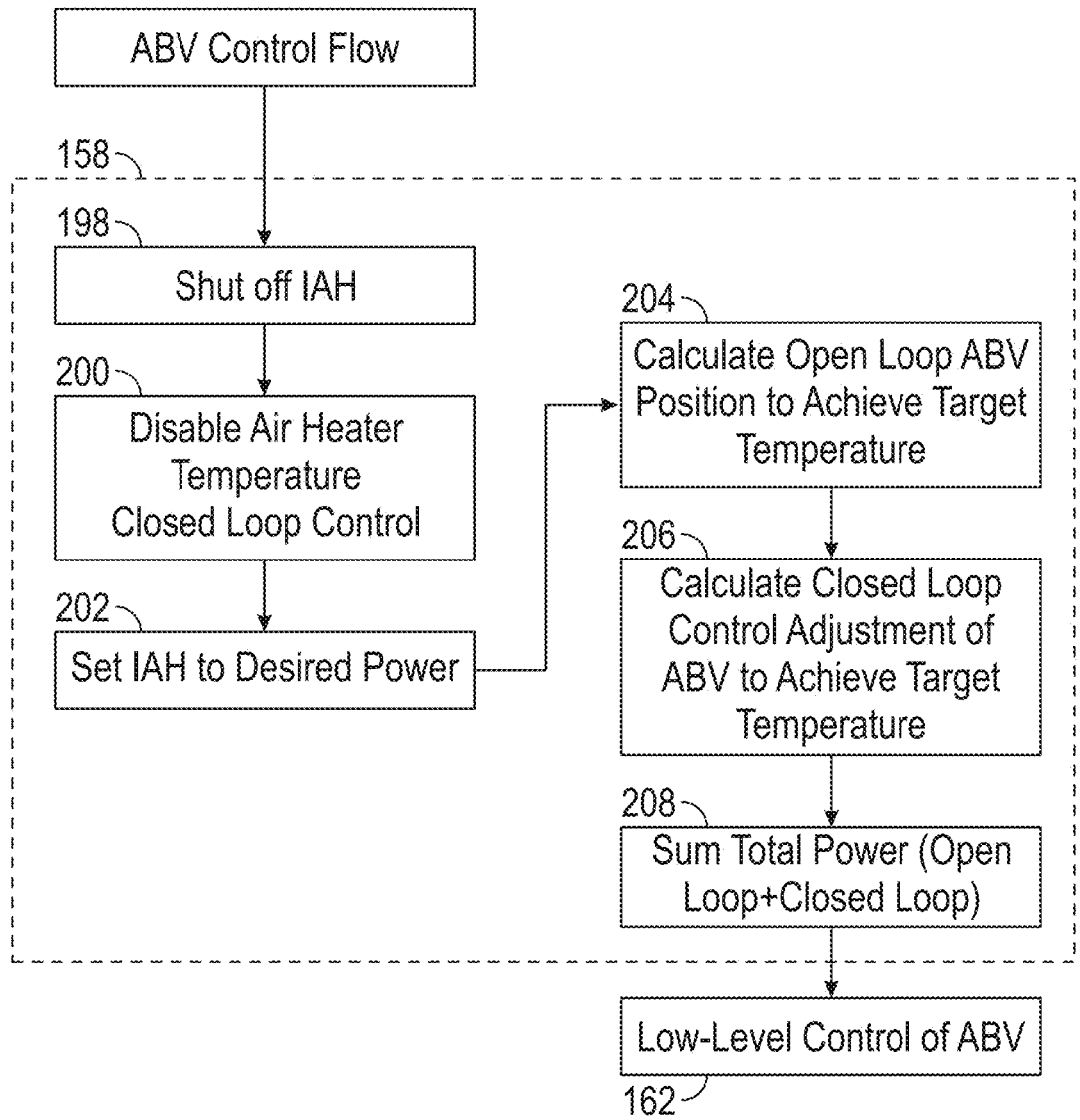
FIG. 5 schematically illustrates steps of a process for effecting air temperature control with an intake air heater as a primary actuator and as initially introduced in FIG. 2, in accordance with one or more embodiments.

In accordance with one or more embodiments, FIG. 5 schematically illustrates steps of the process 158/162 for effecting air temperature control with the ABV 120 as a primary actuator and as initially introduced in FIG. 2. As shown, the IAH 128 may first (198) be shut off (i.e., its power set to zero kilowatts). The ABV 120 is then controlled for the purpose of heating the intake air to the target temperature.

In accordance with one or more embodiments, IAH temperature closed loop control is disabled (200) while the ABV 120 is controlled to the "maximum hot" position. The IAH 128 is then controlled to a desired power level (202) in support of the use of ABV 120 as the primary actuator. Thus, in accordance with the present working example, the IAH 128 can be set to an "intermediate" position, in support of overall temperature via the ABV 120, after first being set to a "zero" or "disabled" position. This may be of benefit in extreme cold ambient conditions where the engine is operated at low loads and the coolant never completely warms up. Thus, this may well be understood as a scenario where electric intake air heating is justified.

In accordance with one or more embodiments, for an ongoing process of active control of the ABV 120, an open loop power request for the ABV 120 is calculated (204). Here, as well, the open loop power request may be utilized to respond quickly to a transient temperature request, and can be based on the previously calculated maximum and minimum ABV port air temperatures. Thus, by way of illustrative example, a lookup table may be utilized that maps the target temperature, expressed as a ratio or proportion relative to the range bounded by the calculated maximum and minimum ABV port air temperatures, to different quantities of intake manifold airflow. By way of another illustrative example, a physics-based model may be utilized that takes into account temperature loss to components such as the ABV 120 and intake manifold 127 as well as mixing effected by the ABV 120.

In accordance with one or more embodiments, a closed loop system is then used to supplement the open loop power request (206). Thus here, as well, the closed loop system can be utilized to help achieve the final target temperature and compensate for errors or variances effected by the open loop model. As such, the closed loop system here can utilize as inputs the target temperature and intake port temperatures measured via sensor 125c. By way of illustrative and non-restrictive example, a PID controller can be utilized to augment the ABV position calculated via the open loop system.

In accordance with one or more embodiments, a target position for the ABV 120 may then be determined by summing terms calculated for the open loop power request and the closed loop power request (208). The ABV 120 can then be controlled to the target position via any of a great variety of procedures, e.g., via using a PWM duty cycle control with an H-bridge.

Figure 6:
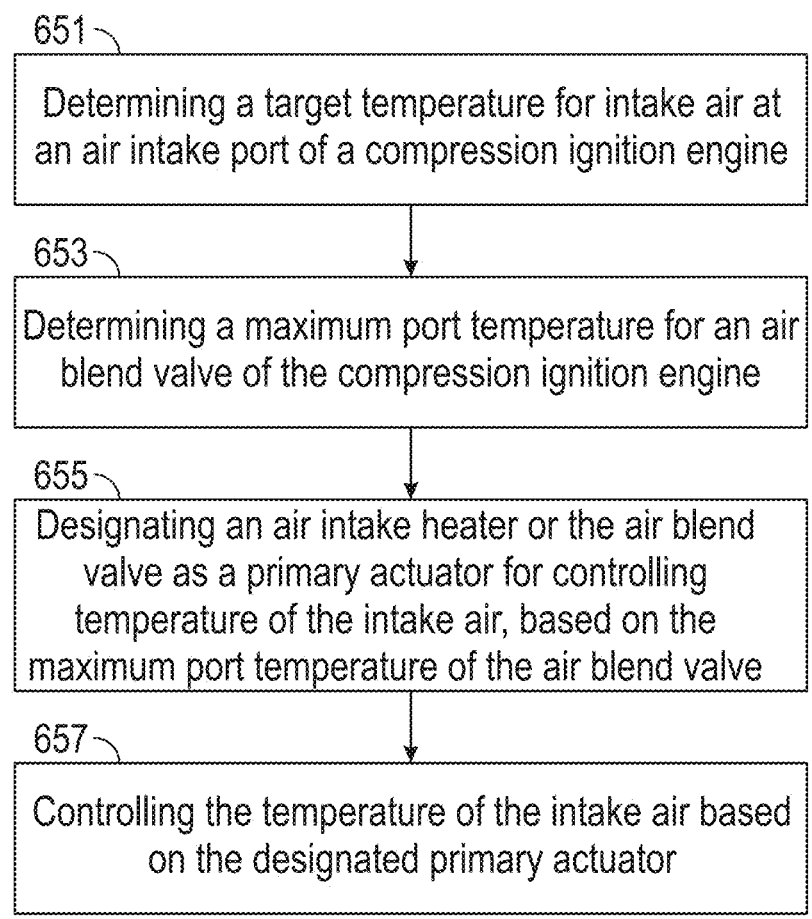
FIG. 6 shows a flowchart of a method in accordance with one or more embodiments.

FIG. 6 shows a flowchart of a method, as a general overview of steps which may be carried out in accordance with one or more embodiments described or contemplated herein. Specifically, FIG. 6 describes a method of controlling intake air temperature in a compression ignition engine. One or more blocks in FIG. 6 may be performed using one or more components as described in FIGS. 1-5 and 7. While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

As such, in accordance with one or more embodiments, a target temperature is determined for intake air at an air intake port of a compression ignition engine (Step 651). In accordance with at least one illustrative example, this may correspond to the process indicated at 150, and described and illustrated with respect to FIGS. 2 and 3. A maximum port temperature is determined for an air blend valve of the compression ignition engine (Step 653). In accordance with at least one illustrative example, this may correspond to the process indicated at 152, and described and illustrated with respect to FIGS. 2 and 3.

In accordance with one or more embodiments, a designation is made of an intake air heater or the air blend valve as a primary actuator for controlling temperature of the intake air, based on the maximum port temperature of the air blend valve (Step 655). In accordance with at least one illustrative example, this may correspond to the process indicated at 154, and described and illustrated with respect to FIGS. 2 and 3. The temperature of the intake air is controlled based on the designated primary actuator (Step 657). In accordance with at least one illustrative example, this may correspond to the process indicated at 156 and 160, or at 158 and 162, and described and illustrated with respect to FIGS. 1, 4 and 5.

Figure 7:
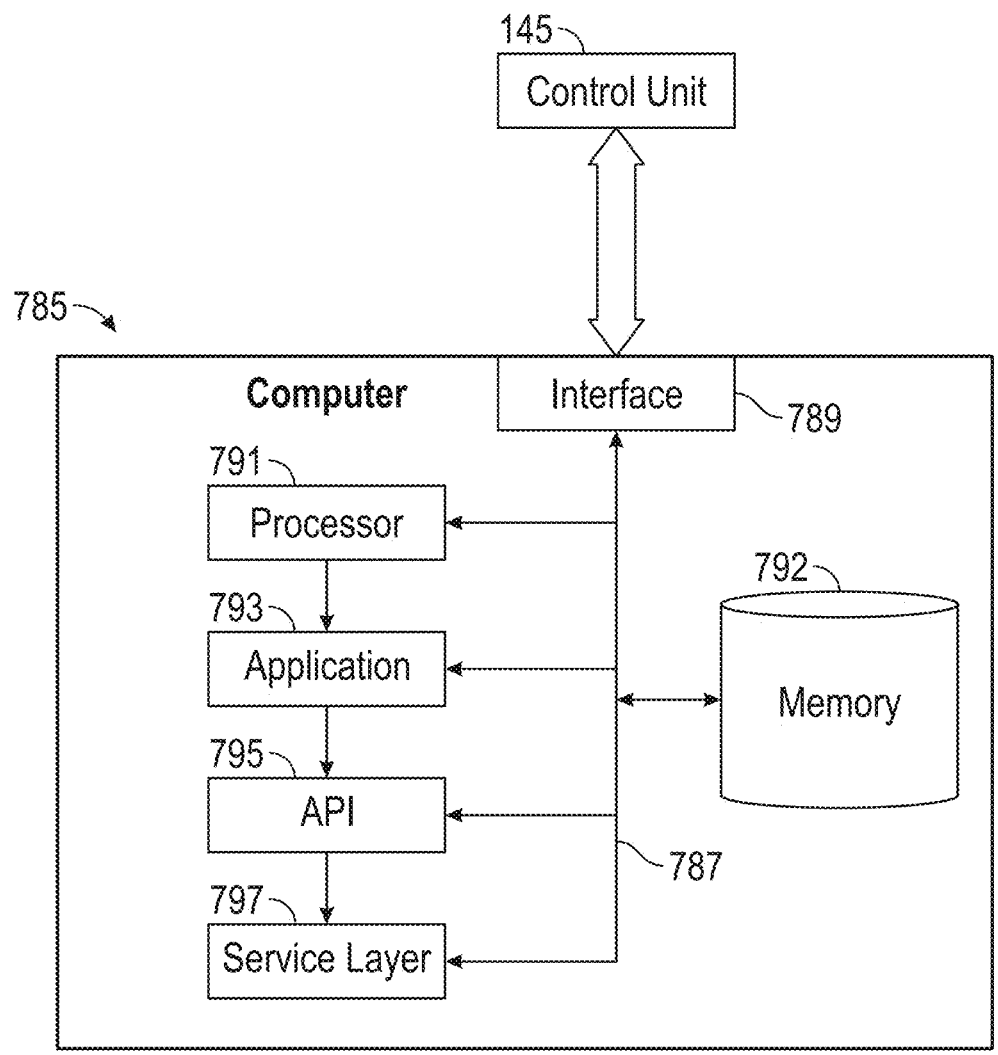
FIG. 7 schematically illustrates a computing device and related components, in accordance with one or more embodiments.

FIG. 7 schematically illustrates a computing device and related components, in accordance with one or more embodiments. As such, FIG. 7 generally depicts a block diagram of a computer system 785, that may be disposed onboard a vehicle and used to provide computational functionalities associated with described algorithms, methods, functions, processes, flows, and procedures as described in this disclosure, according to one or more embodiments. In this respect, computer 785 may interface with a control unit 145 such as that described and illustrated with respect to FIG. 2, either directly (e.g., via hard-wired connection) or over an internal network. Alternatively, the computer 785 illustrated in FIG. 7 may correspond directly to the control unit 145 described and illustrated with respect to FIG. 1.

In accordance with one or more embodiments, the illustrated computer 785 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 785 may include a computer that includes an input device, such as a keypad, keyboard, touch screen, or other device that can accept user information, and an output device that conveys information associated with the operation of the computer 785, including digital data, visual, or audio information (or a combination of information), or a GUI.

The computer 785 can serve in a role as a client, network component, a server, a database or other persistency, or any other component (or a combination of roles) of a computer system for performing the subject matter described in the instant disclosure. The illustrated computer 785 is communicably coupled with control unit 145. Generally, one or more components of the computer 785 may be configured to operate within environments, including cloud-computing-based, local, global, or other environment (or a combination of environments).

At a high level, the computer 785 is an electronic computing device operable to receive, transmit, process, store, or manage data and information associated with the described subject matter. According to some implementations, the computer 785 may also include or be communicably coupled with an application server, e-mail server, web server, caching server, streaming data server, business intelligence (BI) server, or other server (or a combination of servers).

The computer 785 can receive requests from a client application (for example, executing at control unit 145) and responding to the received requests by processing the said requests in an appropriate software application. In addition, requests may also be sent to the computer 785 from internal users (for example, from a command console or by other appropriate access method), external or third-parties, other automated applications, as well as any other appropriate entities, individuals, systems, or computers.

Each of the components of the computer 785 can communicate using a system bus 787. In some implementations, any or all of the components of the computer 785, both hardware or software (or a combination of hardware and software), may interface with each other or the interface 789 (or a combination of both) over the system bus 787 using an application programming interface (API) 795 or a service layer 797 (or a combination of the API 795 and service layer 797. The API 795 may include specifications for routines, data structures, and object classes. The API 795 may be either computer-language independent or dependent and refer to a complete interface, a single function, or even a set of APIs. The service layer 797 provides software services to the computer 785 or other components (whether or not illustrated) that are communicably coupled to the computer 785. The functionality of the computer 785 may be accessible for all service consumers using this service layer. Software services, such as those provided by the service layer 797, provide reusable, defined business functionalities through a defined interface. For example, the interface may be software written in JAVA, C++, or other suitable language providing data in extensible markup language (XML) format or another suitable format. While illustrated as an integrated component of the computer 785, alternative implementations may illustrate the API 795 or the service layer 797 as stand-alone components in relation to other components of the computer 785 or other components (whether or not illustrated) that are communicably coupled to the computer 785. Moreover, any or all parts of the API 795 or the service layer 797 may be implemented as child or sub-modules of another software module, enterprise application, or hardware module without departing from the scope of this disclosure.

The computer 785 includes an interface 789. Although illustrated as a single interface 789 in FIG. 7, two or more interfaces 789 may be used according to particular needs, desires, or particular implementations of the computer 785. The interface 789 is used by the computer 785 for communicating with other systems in a distributed environment.

Generally, the interface 789 includes logic encoded in software or hardware (or a combination of software and hardware) and operable to communicate with the other systems. More specifically, the interface 789 may include software supporting one or more communication protocols associated with communications such that hardware of interface 789 or of other systems is operable to communicate physical signals within and outside of the illustrated computer 785.

The computer 785 includes at least one computer processor 791. Although illustrated as a single computer processor 791 in FIG. 7, two or more processors may be used according to particular needs, desires, or particular implementations of the computer 785. Generally, the computer processor 791 executes instructions and manipulates data to perform the operations of the computer 785 and any algorithms, methods, functions, processes, flows, and procedures as described in the instant disclosure.

The computer 785 also includes a memory 792 that holds data for the computer 785 or other components (or a combination of both) that can be connected thereto (such as control system 145). For example, memory 792 can be a database storing data consistent with this disclosure. Although illustrated as a single memory 792 in FIG. 7, two or more memories may be used according to particular needs, desires, or particular implementations of the computer 785 and the described functionality. While memory 792 is illustrated as an integral component of the computer 785, in alternative implementations, memory 792 can be external to the computer 785.

The application 793 is an algorithmic software engine providing functionality according to particular needs, desires, or particular implementations of the computer 785, particularly with respect to functionality described in this disclosure. For example, application 793 can serve as one or more components, modules, applications, etc. Further, although illustrated as a single application 793, the application 793 may be implemented as multiple applications 793 on the computer 785. In addition, although illustrated as integral to the computer 785, in alternative implementations, the application 793 can be external to the computer 785.

There may be any number of computers 785 associated with, or external to, a computer system containing computer 785, wherein each computer 785 may communicate over a network or via another arrangement. Further, the term "client," "user," and other appropriate terminology may be used interchangeably as appropriate without departing from the scope of this disclosure. Moreover, this disclosure contemplates that many users may use one computer 785, or that one user may use multiple computers 785.

Although only a few example embodiments have been described in detail above, those skilled in the art will readily appreciate that many modifications are possible in the example embodiments without materially departing from this invention. In addition, many modifications will be appreciated by those skilled in the art to adapt a particular instrument, situation, or material to embodiments of the disclosure without departing from the essential scope thereof. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A method comprising: determining a target temperature for intake air at an air intake port of a compression ignition engine; determining a maximum port temperature for an air blend valve of the compression ignition engine; designating an intake air heater or the air blend valve as a primary actuator for controlling temperature of the intake air, based on the maximum port temperature of the air blend valve; controlling the temperature of the intake air based on the designated primary actuator, wherein determining the maximum port temperature for the air blend valve comprises inputting one or more temperature measurements from a charge air cooler, wherein: the charge air cooler includes a high-temperature portion and a low-temperature portion; and inputting one or more temperature measurements from the charge air cooler comprises measuring temperatures at an outlet of the high-temperature portion and at an outlet of the low-temperature portion, wherein designating the primary actuator comprises designating the air blend valve as the primary actuator if the target temperature is less than the maximum port temperature for the air blend valve, and wherein designating the primary actuator comprises designating the intake air heater as the primary actuator if the target temperature is greater than or equal to the maximum port temperature for the air blend valve.

2. The method according to claim 1, wherein determining the target temperature comprises:
   determining an engine mode;
   utilizing a temperature model that is based on the determined engine mode; and
   thereupon determining the target temperature.

3. The method according to claim 2, wherein determining the engine mode comprises determining one of: a cranking mode; a cold start mode; a rebreathe mode; or a normal mode.

4. The method according to claim 1, wherein designating the primary actuator comprises comparing the target temperature with the maximum port temperature for the air blend valve.

5. The method according to claim 1 wherein, if the intake air heater is designated as the primary actuator, controlling the temperature of the intake air comprises:
   setting the air blend valve to a maximum heating position; and controlling the intake air heater to provide additional heating that achieves a difference between the maximum temperature for the air blend valve and the target temperature.

6. The method according to claim 5, wherein controlling the intake air heater to provide additional heating comprises:
calculating an open loop power request for the intake air heater;
calculating a closed loop power request for the intake air heater, based on feedback including a measured temperature at the air intake port; and
summing the open loop power request and the closed loop power request to control power to the intake air heater.

7. The method according to claim 1 wherein, if the air blend valve is designated as the primary actuator, controlling the temperature of the intake air comprises:
shutting off power to the intake air heater; and
controlling the air blend valve to uniquely heat the temperature of intake air to the target temperature.

8. The method according to claim 5, wherein controlling the intake air heater to provide additional heating comprises:
calculating an open loop power request for the air blend valve;
calculating a closed loop power request for the air blend valve, based on feedback including a measured temperature at the air intake port; and
summing the open loop power request and the closed loop power request to control power to the intake air heater.

9. The method according to claim 1, wherein the compression ignition engine is a gas compression ignition engine.

10. A compression ignition engine comprising: an air intake port; an intake air heater disposed upstream of the air intake port; an air blend valve in communication with the intake air heater and the air intake port; and a control unit configured to: determine a target temperature for intake air at the air intake port; determine a maximum port temperature for the air blend valve; designating the intake air heater or the air blend valve as a primary actuator for controlling temperature of the intake air, based on the maximum port temperature of the air blend valve; control the temperature of the intake air based on the designated primary actuator, wherein determining the maximum port temperature for the air blend valve comprises inputting one or more temperature measurements from a charge air cooler, wherein: the charge air cooler includes a high-temperature portion and a low-temperature portion; and inputting one or more temperature measurements from the charge air cooler comprises measuring temperatures at an outlet of the high-temperature portion and at an outlet of the low-temperature portion, wherein designating the primary actuator comprises designating the air blend valve as the primary actuator if the target temperature is less than the maximum port temperature for the air blend valve, and wherein designating the primary actuator comprises designating the intake air heater as the primary actuator if the target temperature is greater than or equal to the maximum port temperature for the air blend valve.

11. The compression ignition engine according to claim 10, wherein the control unit is configured to determine the target temperature via:
determining an engine mode;
consulting a temperature model that is based on the determined engine mode; and
thereupon determining the target temperature.

12. The compression ignition engine according to claim 10, wherein the control unit is configured to designate the primary actuator via comparing the target temperature with the maximum port temperature for the air blend valve.

13. The compression ignition engine according to claim 10 wherein, if the intake air heater is designated as the primary actuator, the control unit is configured to control the temperature of the intake air via:
setting the air blend valve to a maximum heating position; and
controlling the intake air heater to provide additional heating that achieves a difference between the maximum temperature for the air blend valve and the target temperature.

14. The compression ignition engine according to claim 10 wherein, if the air blend valve is designated as the primary actuator, the control unit is configured to control the temperature of the intake air via:
shutting off power to the intake air heater; and
controlling the air blend valve to uniquely heat the temperature of intake air to the target temperature.

15. The compression ignition engine according to claim 10, wherein the compression ignition engine is a gas compression ignition engine.

16. A non-transitory computer-readable storage medium having computer-readable instructions stored thereon, which when executed by a computer cause the computer to perform a method comprising: determining a target temperature for intake air at an air intake port of a compression ignition engine; determining a maximum port temperature for an air blend valve of the compression ignition engine; designating an intake air heater or the air blend valve as a primary actuator for controlling temperature of the intake air, based on the maximum port temperature of the air blend valve; controlling the temperature of the intake air based on the designated primary actuator, wherein determining the maximum port temperature for the air blend valve comprises inputting one or more temperature measurements from a charge air cooler, wherein: the charge air cooler includes a high-temperature portion and a low-temperature portion; and inputting one or more temperature measurements from the charge air cooler comprises measuring temperatures at an outlet of the high-temperature portion and at an outlet of the low-temperature portion, wherein designating the primary actuator comprises designating the air blend valve as the primary actuator if the target temperature is less than the maximum port temperature for the air blend valve, and wherein designating the primary actuator comprises designating the intake air heater as the primary actuator if the target temperature is greater than or equal to the maximum port temperature for the air blend valve.

* * * * *